United States Patent [19]

Pritchard et al.

[11] 3,820,157

[45] June 25, 1974

[54] COLOR TELEVISION

[75] Inventors: Dalton H. Pritchard, Princeton, N.J.; Alfred C. Schroeder, Huntingdon Valley, Pa.

[73] Assignee: Radio Corporation of America, Princeton, N.J.

[22] Filed: July 25, 1952

[21] Appl. No.: 300,855

[52] U.S. Cl. .......................................358/30, 358/23

[51] Int. Cl. ............................................. H04n 9/02

[58] Field of Search.............................. 178/5.2, 5.4; 250/27.1–27.3, 20.35

[56] References Cited

UNITED STATES PATENTS

| | | | |
|---|---|---|---|
| 2,497,840 | 2/1950 | Seeley | 250/27.1 |
| 2,632,046 | 3/1953 | Goldberg | 178/5.4 |
| 2,728,813 | 12/1955 | Loughlin | 178/5.4 |
| 2,943,142 | 6/1960 | Loughlin | 178/5.2 |

*Primary Examiner*—Richard Murray

*Attorney, Agent, or Firm*—E. M. Whitacre; William H. Meagher

[57] ABSTRACT

Color television signal detection apparatus utilizing only two synchronous detectors, the output signals of the two detectors, being combined with each other to derive a third signal of the same type as that provided by the synchronous detectors themselves, each of these signals then being combined with the luminance signal to provide the three desired signals representative of the color components.

5 Claims, 3 Drawing Figures

INVENTORS
DALTON H. PRITCHARD
& ALFRED C. SCHROEDER

BY [signature]
ATTORNEY

INVENTORS
DALTON H. PRITCHARD
& ALFRED C. SCHROEDER
BY [signature]
ATTORNEY

INVENTORS
DALTON H. PRITCHARD
& ALFRED C. SCHROEDER

BY [signature]
ATTORNEY

COLOR TELEVISION

This invention relates to improvements in color television receivers and in particular to improvements in synchronous detectors employed therein.

In one color television system the signal representing the required video information has two video components. One component represents variations in brightness and corresponds in most respects to the signal heretofore employed in standard black and white television systems. The other video component is a color carrier that is phase and amplitude modulated in accordance with the hue and saturation of the color represented.

One way of deriving the color carrier is as follows. The output of a color oscillator of color carrier frequency is applied to a phase splitter and each differently phased output of the phase splitter is amplitude modulated with signals representing different sets of color information. Each set of color information may represent different combinations of the brightness component and the component colors selected for the system. Usually red, green and blue are employed. The output signals of the separate modulators are then combined to provide the desired color carrier. In order to save bandwidth, the frequency of the color carrier is so chosen and the upper frequency limit of the color information applied to the modulators is so set that the color carrier and at least some of its sidebands are within the upper portion of the frequency spectrum occupied by the brightness signal.

The color information conveyed by the color carrier and the portion of its sidebands lying in the upper region of the video spectrum can be recovered at a receiver by applying the received signals lying in this region to a plurality of synchronous detectors which serve to heterodyne them with different phases of the color carrier frequency. The sets of color information provided by the synchronous detectors then may be combined with the total received signal so as to derive signals representing the selected component colors. These latter signals then may be applied to a suitable means for forming an image in color.

It has previously been suggested that the outputs of two synchronous detectors be combined with the total received signal so as to derive two signals, each representing the intensity variations of a different selected component color. These two color signals were then subtracted from the total received signal so as to derive a signal representing a third selected component color. However, it has been found that the total received signal must be delayed in order to allow for the delay caused by the apparatus that combined it with the outputs of the synchronous detectors so as to derive the signals representing the first two selected component colors. Furthermore, when the signal representing the third component color is derived in this manner, its relative amplitude to the other color signals may not be correct and this required additional gain control apparatus.

In another previous arrangement, three synchronous detectors have been employed in such manner that when the output of each synchronous detector is combined with the total received signal, a signal representing one selected component color is produced. These signals have proper time relations and proper relative amplitude. However, it has been found advantageous to change at field rate the phase relationships of the waves of color carrier frequency that are applied to the different modulators at the transmitter. Thus during one field a particular color may be represented by one phase of the color carrier and during the next field the same color may be represented by a different phase. Therefore at the receiver, corresponding phase changes must be made in the waves of color carrier frequency applied to the different synchronous detectors. Where such a color phase alternation system is employed, the phases of the color carrier waves applied to two of the synchronous detectors are generally interchanged. If only two synchronous detectors are employed, the color phase alternation can be secured by changing the phase of waves of color carrier frequency that is applied to one of them during successive fields. The equipment for producing color phase alternation when two synchronous detectors are employed is much simpler than the equipment required to produce color phase alternation when three synchronous detectors are employed. In addition it is easier to adjust and operate. However, as pointed out above, the use of two synchronous detectors requires additional delay circuits in the channel carrying the total received signal as well as additional gain controls.

It is therefore the object of this invention to provide an improved color detection apparatus that employs only two synchronous detectors in such manner as to avoid the necessity for additional delays and gain controls.

This objective can be achieved by combining the outputs of two synchronous detectors with each other so as to derive a third signal of the same type but not necessarily of the same polarity as that provided by the synchronous detectors themselves. The output signal of the two synchronous detectors are combined as previously described in connection with a prior arrangement so as to derive signals representing two selected component colors. The third signal derived from the combination of the outputs of the two synchronous detectors is also combined with the total received signal so as to derive a signal representative of the third selected component color. Thus it may be said that the third color signal is derived directly from the outputs of the two synchronous detectors rather than from the signals representing only the selected component colors. As will become apparent from the detailed description below, this change in the manner of deriving the third color signal also permits a simplification of equipment.

The details of the invention will be better understood after a detailed consideration of the drawings in which.

The present invention may be used advantageously in any color television system of the type set forth above, i.e., one in which the color carrier is modulated with sets of color information that contain components of each of the selected component colors. Many variations in the respective compositions of the brightness signal and the sets of color information that are applied to the modulators at the transmitter so as to form the color carrier may be employed, but the invention will be described as embodied in a color television system described in an article entitled "Principles of NTSC Compatible Color Television" commencing on page 88 of the February 1952 issue of "Electronics."

In this system, the transmitted signal $E_m$ may be defined by the following expression:

$$E_m = E_y' + 1/1.14\ [1/1.78\ (E_b' - E_y')\ \mathrm{Sin}\ \omega t + (E_r' - E_y')\ \mathrm{Sin}\ (\omega t \pm 90°)] \qquad (a)$$

where $E_y'$ is the gamma corrected brightness signal that is comprised of gamma corrected color signals as indicated by the expression:

$$E_y' = 0.59\ E_g' + 0.30\ E_r' + 0.11\ E_b' \qquad (b)$$

where $E_g'$, $E_r'$ and $E_b'$ represent the green, red and blue gamma selected component color signals respectively and $\omega$ is the frequency of the color carrier expressed in radians. The color carrier may be derived during one field by modulating a zero degree phase of the color carrier frequency with a blue color difference signal $E_b'-E_y'$ reduced by a factor of 2.03, i.e. 1.14×1.78 in expression $a$ and a 90° phase of a red color difference signal $E_r'-E_y'$ that is reduced by a factor of 1.14. During the next field the color carrier may be derived by modulating a zero degree phase of the color carrier frequency with the same portion of the blue color difference signal $E_b'-E_y'$ as before but by modulating a 270° phase of the color carrier frequency with the same portion of the red color difference signal $E_r'-E_y'$. The upper frequency of the color difference signals may be limited to some low value such as 1 megacycle so that the sidebands produced by the modulator in response to the color difference signals lie within 1 megacycle on each side of the color carrier frequency $\omega$. As $\omega$ is generally placed rather high in the video spectrum of the brightness signal, the color information represented by the sidebands lies in the upper portion of the video spectrum. During each field the outputs of the modulators are combined to form the color carrier and it is added to the brightness signal $E_y'$. The brightness signal $E_y'$ is itself derived by adding the different color signals in the proportions indicated by the expression $b$. The portion of the color difference signals applied to the modulators is indicated by the coefficients of the expression $a$.

Figure 1:
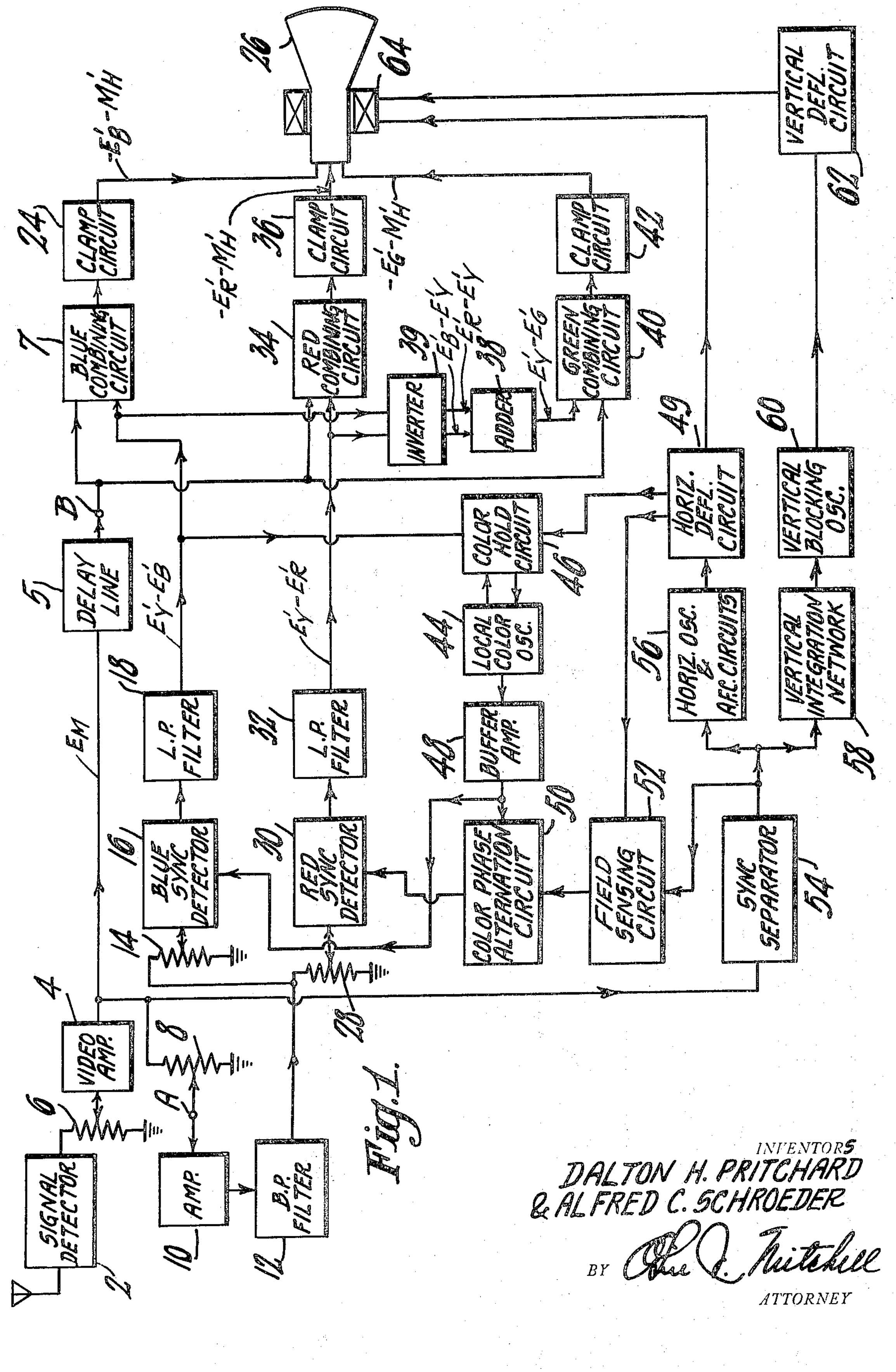
FIG. 1 is a block diagram of one form of color television receiver in which this invention may be employed.

One form of receiver that may be used to reproduce images in color from the signal $E_m$ and which embodies the present invention is illustrated in the block diagram of FIG. 1. The signal $E_m$ is recovered by any suitable signal detector 2, and a desired portion of it is supplied to a video amplifier 4 via a contrast control 6 that is shown as a potentiometer. The output of the video amplifier is applied via a delay line 5 to a blue combining circuit 7. A desired portion of the output of the video amplifier is selected by a chroma control 8, here shown as a potentiometer, and is coupled via an amplifier 10 to a band pass filter 12 that is designed to pass frequencies in the upper region of the video spectrum occupied by the sidebands containing the color information. A portion of the output of the band pass filter 12 is coupled by a potentiometer 14 to a blue synchronous detector 16 wherein it is heterodyned with a zero degree phase of the color carrier frequency. It is to be understood that this zero degree phase is the same phase as the color carrier has at the synchronous detector when it is zero degrees at the transmitter. The manner in which this phase of the color carrier frequency is derived will be described below. If the transmitted and received signal $E_m$ is as represented by the expression $a$ and if the overall relative gain of the chroma control 8, the amplifier 10, the band pass filter 12, the potentiometer 14, the synchronous detector 16 and the low pass filter 18 with respect to the gain afforded by the signal $E_m$ by the delay line 5 is 2.03, the negative blue color difference signal $E_y'-E_b'$ is recovered. The heterodyning action of the synchronous detector produces upper and lower sidebands, and the lower sidebands containing the color difference signals in their original frequency is selected by a low pass filter 18. If the lowest frequency passed by the band pass filter 12 is not lower than the highest frequency passed by the low pass filter 18, no frequencies of the signal $E_m$ will pass directly through both of them. The negative blue color difference signal $E_y'-E_b'$ that appears at the output of the low pass filter 18 is then applied to the blue combining circuit 7. The signal $E_m$ appearing at the output of the video amplifier 4 is delayed by a delay line 5 by the same amount that the negative blue color difference signal $E_y'-E_b'$ is delayed in passing from the output of the video amplifier 4 to the input of the combining circuit 7. Thus the signal $E_m$ and the negative color difference signal $E_y'-E_b'$ arrive at the input of the combining circuit 7 in proper time relationship. The gain of the blue synchronous detector 16 is generally made greater than the maximum required so that the chroma control 8 can be adjusted to increase or decrease the relative amplitude of the color difference signal with respect to the signal $E_m$. In this way the amplitude of the brightness component $E_y'$ in the signal $E_m$ can be made equal to the amplitude of the corresponding brightness component $E_y'$ in the negative blue color difference signal. With the polarities indicated the subtraction of the signal $E_m$ from the negative color difference signal $E_y'-E_b'$ yields ($c$) $E_y'-E_b'-E_y'$ - (A.C. components of expression $a$). The A.C. components may be termed mixed highs $M_H$ as they are the high frequency components of all colors combined. The low frequency brightness components of $E_y'$ and $-E_y'$ cancel out. The high frequency components $-M_H$ of $-E_y'$ pass through the combiner 7. The signals at the output of the combiner 7 including the high frequency portion $-M_H$ of the brightness signal $-E_y'$ and the low frequency color signal $-E_b'$ are clamped in normal manner by a d.c. restoration or clamp circuit 24 before being applied to an electrode of a color kinescope 26 that controls the intensity of the blue light emitted by the kinescope.

In order to recover the red signal $-E_r'$ the following operation is performed. The output of the band pass filter 12 is coupled via a potentiometer 28 to a red synchronous detector 30 wherein it is heterodyned during successive fields with 90° and 270° phases of the color carrier frequency that are derived in a manner to be described. Two sidebands are produced by the modulation process, and the lower one containing the original frequencies of the negative red color difference signal $E_y'-E_r'$ that was applied to one of the modulators at the transmitter is selected by a low pass filter 32 and is applied to a red combining circuit 34 where it is combined with the total received signal $E_m$ (see expression a) in such manner as to cancel out the low frequency portion of the brightness signal $E_y'$ and produce the low frequency red color signal $-E_r'$. This signal, the high frequency portion $-M_H$ of $-E_y'$ and the color carrier and its sidebands are all clamped in a normal manner by a clamp circuit 36 before being applied to an electrode in the kinescope 26 that controls the intensity of the red light emitted.

In previous arrangements employing only two synchronous detectors the low frequency signals $-E_b$ and $-E_r$ appearing at the outputs of the combining circuits 7 and 34 were added to the signal $E_m$ so as to derive the green color signal $E_g + M_H$ and an additional amount of delay had to be introduced in the signal $E_m$ so as to compensate for the delay produced by the adders 7 and 34. The delay was increased because of the peaking required in the adder circuits to achieve proper gain. Then, because the brightness component $E_y'$ of the total received signal was comprised as indicated in the expression $b$, the amplitudes of the signals $E_b'$ and $E_r'$ that were added to the total received signal $E_m$ had to be changed.

In accordance with one embodiment of this invention, the negative red color difference signal 0.51 $(E_y'-E_r')$ and the negative blue color difference signal 0.19 $(E_y'-E_b')$ are inverted in separate sections of an inverter 39 and added in an adder 38 so as to derive a negative green color difference signal $E_y'-E_g'$. Inasmuch as only fractional amounts of the color difference signals are required, the adder 38 does not have to furnish any gain and therefore peaking circuits that introduce delay are not required. The negative green color difference signal $E_y'-E_g'$ is then applied to a green combining circuit 40 where it is combined with the signal $E_m$ so as to produce the green color signal $-E_g'$, as well as the mixed high signal $-M_H$. This signal is clamped by a circuit 42 and applied to an electrode of the kinescope 26 that controls the amount of green light emitted.

In the receiver just described the negative color signals $-E_b'$, $-E_r'$ and $-E_g'$ emerged from the various combining circuits. If positive color signals are required the amplifier 10 of FIG. 1 could be a cathode follower so that the polarity of the color signals would not be reversed and the outputs of the synchronous detector would be the original positive color difference signals $E_b'-E_y'$ and $E_r'-E_y'$. In order to cancel the $-E_y'$ term in the combining circuits any known means for inverting the signal $E_m$ could be employed.

The combining circuits of FIG. 1 may serve to subtract the color difference signal from the total signal. However, the broad concept of the invention whereby the color difference signals are so combined so as to derive a third color difference signal can also be realized by using combining circuits that add the two color difference signals. In such an arrangement a positive selected component color signal is derived by adding a positive color difference signal such as $E_b'-E_y'$ to a positive total signal $E_m$ so that the low frequencies of the $-E_y'$ component of the color difference signal cancels out the low frequencies of $+E_y'$ component of $E_m$. If a negative selected color signal is desired, the polarities of both the color difference signal and the signal $E_m$ are reversed.

It is apparent that some means must be provided for supplying the 0° phase of the color carrier frequency to the blue synchronous detector 16 during every field and the 90° and the 270° phases to the red synchronous detector 30 during successive fields in fixed phase relationship with the corresponding phases supplied to the modulators at the transmitter. One way of conveying the synchronizing information is to transmit a burst of 90° phase of the color carrier frequency immediately following each horizontal sync pulse as described in a U. S. Pat. application to Bedford that was filed on Feb. 11, 1950 and bears the Ser. No. 143,800. A similar method is also described in "Electronics" for February 1952 at page 96. The burst may be used in a variety of ways to control the phase and frequency of a local color oscillator 44. In our U. S. Pat. application bearing Ser. No. 300,854 filed on July 25, 1952, for example, advantage is taken of the fact that during the burst interval the output of the blue synchronous detector 14 is zero if the carrier frequency wave applied to the blue synchronous detector is 0°. If the local color oscillator varies in phase in one direction, the output of the blue synchronous detector during time of burst becomes proportionately positive and if the oscillator shifts in phase in the opposite direction, the input of the blue synchronous detector becomes proportionately negative. Then voltages are applied so as to control the frequency and phase of the oscillator. The output of the local oscillator is applied to the blue synchronous detector 14 via a buffer amplifier 48. In order to obtain the phase alternation between 90° and 270° the output of the buffer amplifier 48 is coupled to the red synchronous detector 30 via a color phase alternation circuit 50 described in U. S. Pat. application No. 300,853 filed on July 25, 1952 in the name of Dalton H. Pritchard and Alfred C. Schroeder.

A sensing circuit 52 provides, in response to the flyback pulses occurring in the horizontal deflection circuit 49 and the output of a standard sync separator circuit 54, a control signal that serves to change the phase appearing at the output of the color phase alternation circuit from 90° to 270° at field rate. The field sensing circuit distinguishes the even-numbered line fields from the odd-number line fields.

The scanning of the beams in the kinescope 26 is controlled in any known manner by a horizontal oscillator and AFC circuit 56, the horizontal deflection circuit 49, a vertical integrating network 58, a vertical blocking oscillator 60, a vertical deflection circuit 62 and a yoke 64.

Figure 2:
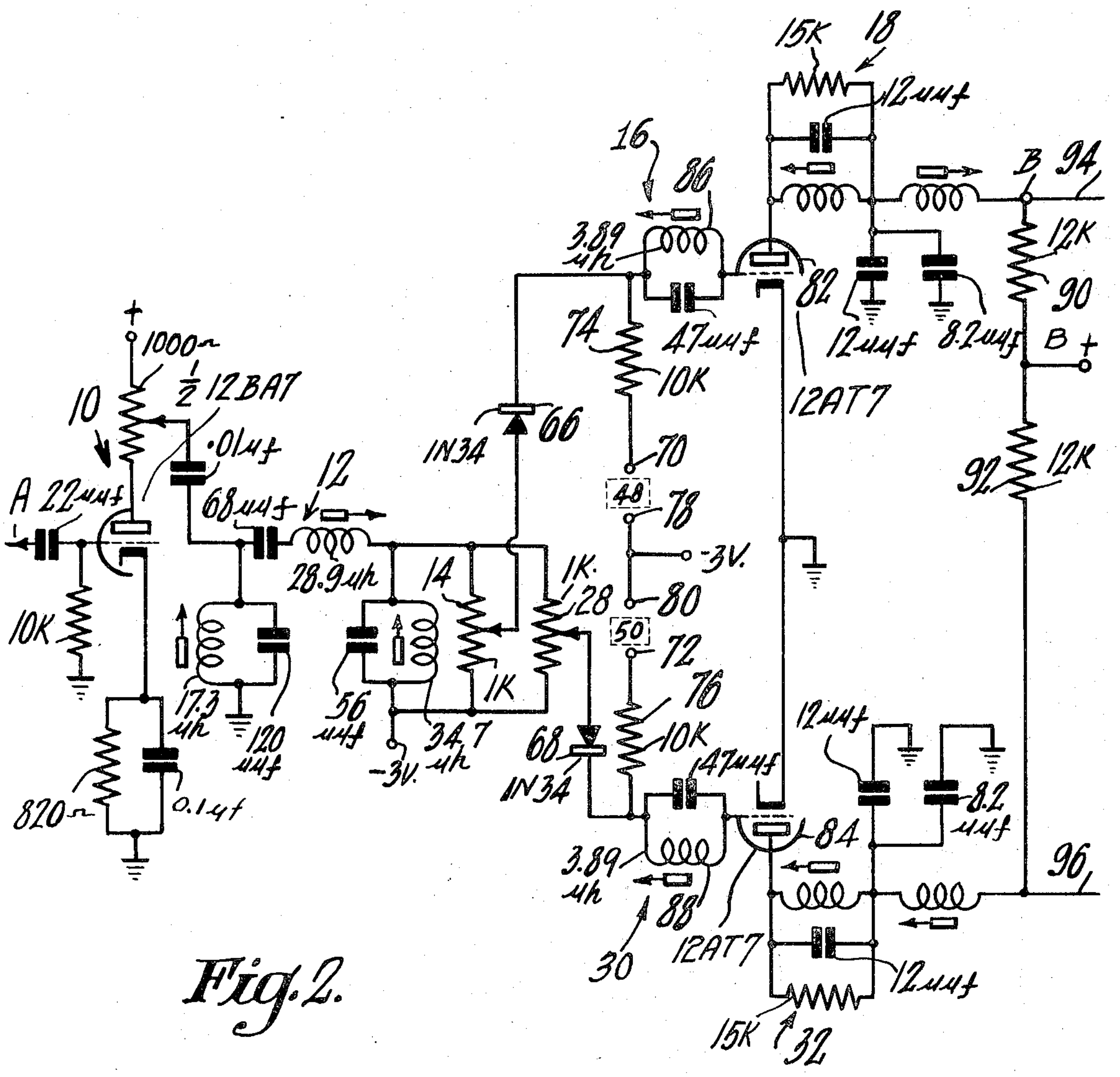
FIG. 2 is a schematic presentation of the synchronous detectors shown in FIG. 1.
Figure 3:
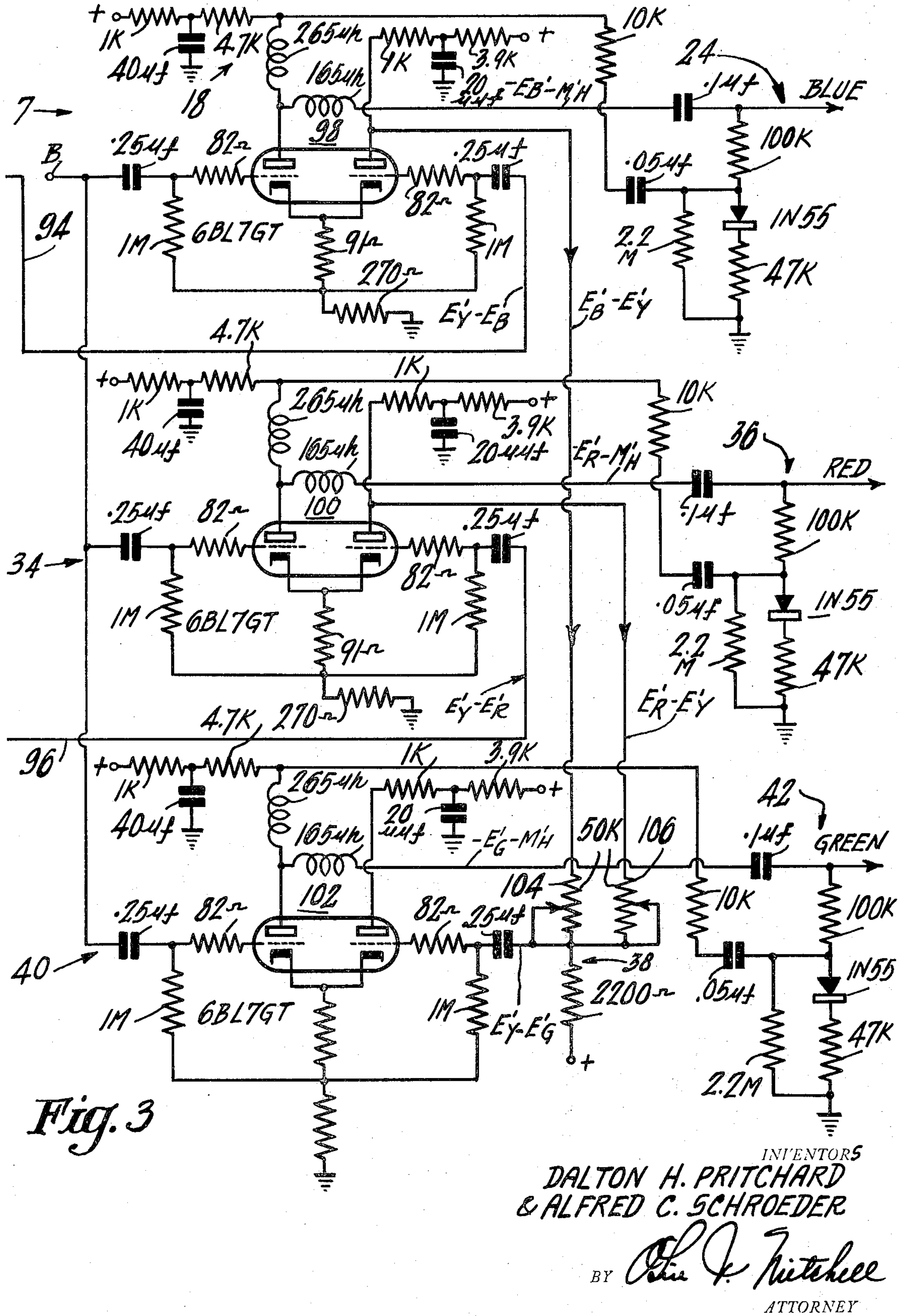
FIG. 3 is a schematic presentation of the combining and adding circuits of FIG. 1.

FIGS. 2 and 3 illustrate the details of a circuit employing a minimum number of components for extracting the negative color signals $-E_b'$, $-E_r'$ and $-E_g'$ from the color carrier. The signals supplied by the chroma control 8 of FIG. 1 appear at the terminal A. After passing through the amplifier 10, the upper region of the signal $E_m$ in which the color carrier and portions of its sidebands lie is selected by a standard constant $K$ band pass filter 12. The potentiometers 14 and 28 are connected in parallel with the second parallel tuned circuit and the lower end of both potentiometers and the parallel circuit are returned to a slight negative voltage which may be −3 volts as indicated. The moveable arms of each of the potentiometers 14 and 28 are respectively connected to similar terminals of unilateral conducting devices 66 and 68. The polarity of the unilateral devices does not matter but it is preferable that they be connected to their corresponding potentiometers in a similar manner. The electrodes of the unilateral devices 66 and 68 that are remote from the potentiometers 14 and 28 are connected to terminals 70 and 72 by the resistors 74 and 76. Terminals 78 and 80 are commonly connected to a source of negative voltage, here shown as minus 3 volts. A source of the zero degree phase of the color carrier frequency, for example the oscillator and buffer amplifier of FIG. 1, is coupled between the terminals 70 and 78. The output of the color phase alternation circuit 50 is coupled between the terminals 72 and 80 so that a 90° phase of the color carrier frequency is applied between these terminals during one field and a 270° phase of the color carrier frequency is applied between them during the next field. The sources are coupled in such a way that the −3 volts d.c. potential appearing on the terminals 78 and 80 is applied to the nearer terminals of the unilateral devices. This voltage balances the −3 volts applied to the other terminals of the unilateral devices via the potentiometers 14 and 28.

The unilateral devices serve to heterodyne the upper region of the video spectrum that is selected by the band pass filter 12 so as to produce upper and lower sidebands across the load resistors 74 and 76. These sidebands are applied to the grids of the sections 82 and 84 of a dual triode tube via parallel resonant circuits 86 and 88 that are sharply tuned to the color carrier frequency. In order to minimize errors due to phase quadrature, the color carrier frequency applied to the unilateral devices is several times the peak amplitude of the color signals applied to the unilateral devices via the potentiometer. The parallel resonant circuits 86 and 88 isolate the grids of the tubes from the sources of carrier frequency and yet permits the sidebands to pass. The −3 volts on the terminals 78 and 80 reach the grids through the inductive branches of the resonant circuits and thus serve to bias the tubes.

The low pass filters 18 and 32 that are coupled in series with load resistors 90 and 92 between the plates of the respective triode sections 82 and 84 and B+ serve to attenuate any carrier frequency that may be present as well as the upper sidebands produced by the heterodyning action of the unilateral devices. Thus as previously explained, the negative blue color difference signal $E_y'-E_b'$ appears across the resistor 90 and the red color difference signal appears across the resistor 92. These signals are coupled to the combining circuits shown in FIG. 3 via leads 94 and 96 respectively.

In FIG. 3, the signal $E_m$ appearing at point $B$ of FIG. 1 is coupled to the left hand side of each of the dual triodes 98, 100 and 102. The lead 94 bearing the negative blue color difference signal $E_y'-E_b'$ is coupled to the right hand section of the dual triode 98 and the lead 96, bearing the negative red color difference signal $E_y'-E_b'$ is coupled to the right hand side of the dual triode 100. Due to the cathode coupling, these same color difference signals appear on the cathodes of the left hand sections of the dual triodes with the same polarity, and hence the output of the left hand sections yield the difference between the signal $E_m$ that is applied to the grids and the color difference signal applied to the cathodes. As noted in the discussion of FIG. 1, the signal is a pure color signal plus the mixed highs $M_H'$. Thus the left hand section of the dual triode 98 yields a low frequency signal $-E_b'$ and a high frequency signal $M_H'$ which is a mixture of the high frequency components of the signals $E_b'$, $E_r'$ and $E_g'$ in the amplitude ratios of these color components illustrated in the expression $b$. In like manner, the dual triode 100 produces the red color signal $-E_r$. These two signals are clamped in conventional manner by the clamp circuits 24 and 36 before being applied to the kinescope that forms the images in color.

Before deriving the green color signal $E_g'$, the negative green color difference signal $(E_y'-E_g')$ is derived by combining a predetermined proportion of the color difference signals $E_b'-E_y'$ and $E_r'-E_y'$ in an adding device 38, which, as shown in FIG. 3 may take the form of potentiometers 104 and 106 connected as shown. Other forms of adders may be employed to combine the signals in this manner, but as only fractional amounts of the blue and red color difference signals are required, the adder need not be in the form of an amplifier.

The negative green color difference signal $E_y'-E_g'$ is applied to the right half of the dual triode 102 and is cathode coupled to the left half so as to be subtracted from the signal $E_m$ that is applied to the grid of the left hand triode. This yields the signal $-E_g$ which is clamped by the clamp circuit 42 before being applied to the kinescope.

Having thus described the invention what is claimed is:

1. In a color television receiver adapted to receive a composite signal including a brightness signal and a color component comprising a subcarrier wave modulated in phase in accordance with a plurality of color difference signals representative of the color of an object, the combination including: a band pass filter for selectively passing composite signal frequencies in a band occupied by said color component; means coupled to the output of said band pass filter for synchronously demodulating said subcarrier wave to separately derive first and second color difference signals; a signal-adding network including a pair of resistors; means for impressing said derived color difference signals respectively upon said resistors, said resistors being connected together to a common terminal at which to develop a third color difference signal; a delay line for said composite signal providing a delayed brightness signal output; and a trio of signal combining circuits of similar configuration, each being coupled to receive said delayed brightness signal and a respectively different one of said three color difference signals.

2. In a color television receiver adapted to receive a composite signal including a brightness signal and a subcarrier wave modulated in quadrature phases respectively in accordance with two color difference signals representative respectively of two color aspects of an object, the combination including: a band pass filter for selectively passing composite signal frequencies in a band occupied by said color component; individual means coupled to the output of said band pass filter for synchronously demodulating said subcarrier wave to separately derive said two color difference signals from said composite signal; a signal-adding network including two resistors; means for impressing said two derived color difference signals respectively upon said two resistors, said resistors being connected together to a common terminal at which to develop a third color difference signal; three electron tubes, each having an input circuit and an output circuit; means including a delay line for impressing said received brightness signal upon the input circuits of all of said tubes; and means for impressing said three color difference signals respectively upon the input circuits of said tubes to produce three component color representative signals in the respective output circuits of said tubes.

3. In color television receiver apparatus, the combination of a source of monochrome signal, a source of first color difference signal, a source of second color difference signal, a first mixer circuit comprising an electron discharge device having a plurality of inputs, a second mixer circuit comprising an electron discharge device having a plurality of inputs, a third mixer circuit comprising an electron discharge device having a plurality of inputs, with said source of monochrome signal connected to one of the inputs of each of said first, second and third mixer circuits, with said source of first color difference signal connected to another of the inputs of the first mixer circuit, and with the source of the second color difference signal connected to another input of the third mixer circuit.

4. In color television receiver apparatus adapted for the reproduction of a televised picture from a composite color signal including a monochrome signal and a color subcarrier, the combination of a monochrome signal source, a first color difference signal source, a second color difference signal source, a first mixer circuit comprising a first dual-triode electron discharge device having a pair of anodes, a pair of cathodes and a first and second control grid, a second mixer circuit comprising a second dual-triode electron discharge device having a pair of anodes, a pair of cathodes and a first and second control grid, a third mixer circuit comprising a third dual-triode electron discharge device having a pair of anodes, a pair of cathodes and a pair of control grids, said monochrome signal source being connected to one of the control grids of each of the first and second dual-triode electron discharge devices, with the first color difference signal source connected to the other control grid of the first dual-triode electron discharge device, and with the second color difference signal source connected to the other control grid of the second dual-triod electron discharge device.

5. A monochrome signal source, a first color difference signal source, a second color difference signal source, a first mixer circuit having a plurality of inputs, a second mixer circuit having a plurality of inputs, and a third mixer circuit having a plurality of inputs, with said source of monochrome signal connected to one of said inputs of each of the first and third mixer circuits, and with said source of monochrome signal being connected through a delay line to one of the inputs of the second mixer circuit.

* * * * *